UNITED STATES PATENT OFFICE.

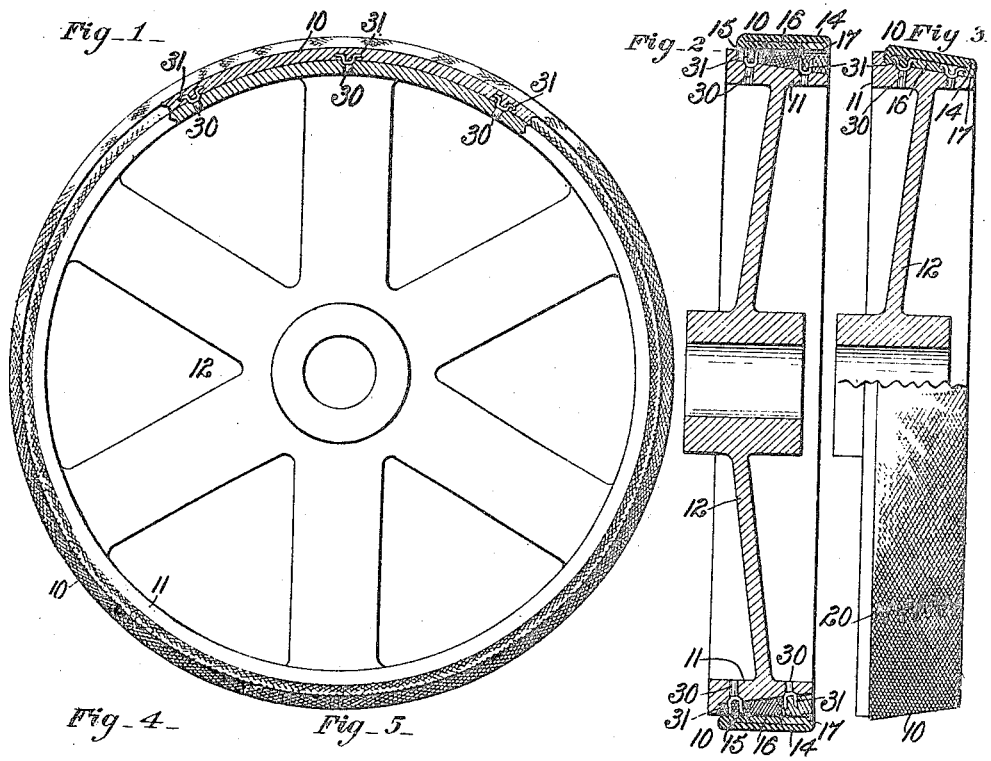
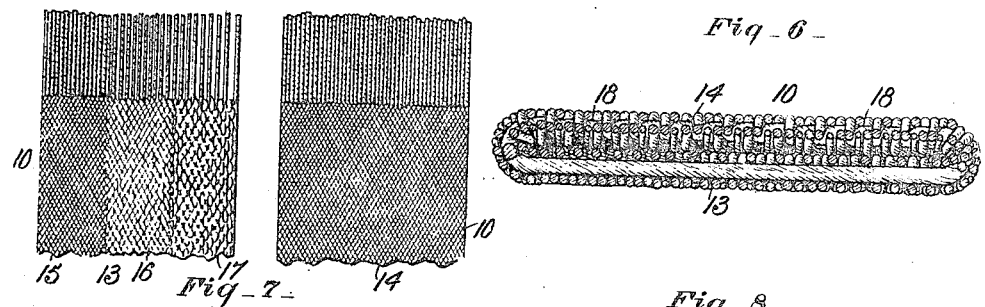
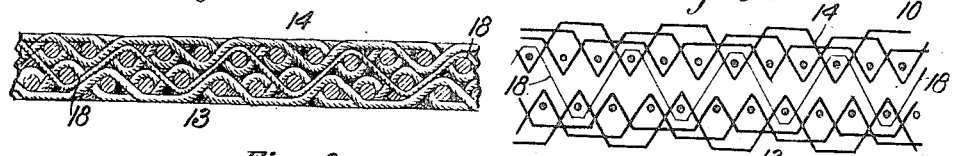

WILLIAM ACHTMEYER, OF MIDDLETOWN, CONNECTICUT.

CONE-CLUTCH LINING.

1,210,131.     Specification of Letters Patent.     Patented Dec. 26, 1916.

Application filed July 10, 1916. Serial No. 108,435.

*To all whom it may concern:*

Be it known that I, WILLIAM ACHTMEYER, a subject of the German Emperor, and a resident of Middletown, in the county of Middlesex and State of Connecticut, have invented a new and Improved Cone-Clutch Lining, of which the following is a full, clear, and exact description.

The object of the invention is to provide a new and improved cone clutch or brake lining of a woven fabric material arranged to permit the use of a straight flat piece of fabric material subsequently shrunk to the conical face of the clutch to assume the shape thereof.

In order to produce the desired result, a webbing of textile material is woven in such a manner that it is gradually denser in texture in a direction transverse to the length of the webbing so that when this webbing is formed into an endless band and placed on a cone clutch and subjected to a shrinking solution then the webbing shrinks onto the peripheral face of the cone clutch and assumes the shape thereof.

A practical embodiment of the invention is represented in the accompanying drawings forming a part of this specification, in which similar characters of reference indicate corresponding parts in all the views.

Figure 1 is a face view of the lining as applied to a cone clutch, parts being shown in section; Fig. 2 is a transverse section of the same with the lining in position prior to the shrinking operation; Fig. 3 is a similar view of the same partly in elevation with the lining shrunk on the cone pulley and fastened thereto by special fastening means; Fig. 4 is an under side view of a portion of the webbing with some of the filling removed to show the arrangement of the warp threads; Fig. 5 is a plan view of the same; Fig. 6 is an enlarged transverse section of the same; Fig. 7 is an enlarged longitudinal section of the same; Fig. 8 is a diagrammatic view of the same; and Fig. 9 is a plan view of a belt formed from a straight piece of webbing and subjected to shrinking action to cause the webbing to assume a segmental shape.

The lining 10 for the conical rim 11 of a clutch 12 or other similar device is preferably formed of a flat straight webbing preferably made of two interwoven plies or layers 13 and 14, of which the layer 13 is the under layer and is adapted to fit onto the peripheral face of the rim 11. The under layer 13 is woven in such a manner that it is gradually denser in texture in a direction transverse to the length of the webbing. This result may be produced in several ways but, as shown, the layer 13 is made in three lengthwise extending portions 15, 16 and 17, of which the portion 17 has a less number of warp threads than the portion 16 and the latter has a less number of warp threads than the portion 15, the portions being preferably alike in width. Thus when the layer 13 is woven the portion 15 is denser in texture than the portion 16 and the latter is denser in texture than the portion 17. The upper layer 14 is of a uniform texture throughout and its warp threads are approximately the same in number to the inch as the portion 15 of the under layer 13. The two layers 13 and 14 are interwoven by the use of the binding thread 18, as indicated in Figs. 6, 7 and 8.

The webbing produced in the manner described is cut off to a suitable length and the ends are then brought together to abut and to be fastened together by stitches 20 (see Fig. 3) or other suitable fastening means, thus forming an endless band of an inner diameter corresponding approximately to the largest diameter of the cone-shaped rim 11. The band is placed in position on the rim 11 with the densest portion at the largest diameter of the rim (see Fig. 2) and then the clutch with the band thereon is immersed in a shrinking solution whereby the webbing is saturated and, owing to the difference in the density of the texture of the webbing, is caused to shrink so that the band assumes the conical shape of the peripheral face of the rim 11 and snugly fits thereon, as plainly indicated in Fig. 3. It is understood that, owing to the less density of the portion 17 relatively to the portions 16 and 15, the portion 17 shrinks more than the said portions 16 and 15, and the portion 16 shrinks more than the portion 15 and less than the portion 17. Thus the shrinking of the band causes a snug fitting of the band on the peripheral face of the rim 11. The outer layer 14, owing to the fact that it is bound by the threads 18 to the layer 13, shrinks with the inner portion and thus assumes with the latter a conical shape. It is understood that the outer layer of the webbing is preferably of uniform texture as it is the wearing surface, so that a uniform wear is insured.

The shrinking solution is used when hot and is preferably of an oily nature capable of saturating the textile material to shrink the same as above described. The shrinking solution impregnates the webbing and makes it more compact, and the solution increases the wearing quality of the lining and insures an easy and smooth running of the clutch when the latter is in use.

In order to hold the lining 10 against displacement on the rim 11 use is made of fastening means such as studs 30 set in the rim 11 and provided with prongs 31 projecting beyond the conical periphery of the rim to be embedded in the lining 10 by the use of a suitable pressure device for spreading the prongs 31 at a point approximately intermediate the two layers 13 and 14 so that the prongs do not project beyond the peripheral face of the lining (see Fig. 3). The particular fastening device described forms the subject matter of a separate application filed under even date herewith.

Although I have shown and described the webbing for use as a lining for cone clutches, it is evident I do not limit myself to this particular use, as ladies' belts 40 of segmental shape, such as shown in Fig. 9 for instance, can be made from a piece of flat straight webbing having a varying density in texture in a direction transverse to the length of the webbing and shrunk on a conical surface in the same manner as above described relatively to the lining.

Having thus described my invention, I claim as new and desire to secure by Letters Patent:

1. As an article of manufacture, a webbing of textile material and gradually denser in texture in a direction transverse to the length of the webbing.

2. As an article of manufacture, a flat straight webbing of textile material and having its texture varying in density in a direction transverse to the length of the webbing.

3. As an article of manufacture, a flat straight webbing of textile material and comprising interwoven parallel portions extending lengthwise of the webbing and of different density in the texture.

4. As an article of manufacture, a flat straight webbing of textile material and comprising interwoven parallel portions extending lengthwise of the webbing, one of the portions being close woven and the next adjacent one being less close woven.

5. As an article of manufacture, a flat straight webbing of textile material and comprising interwoven parallel portions extending lengthwise of the webbing, the warp of one outer portion being close and the warp in the next adjacent portion being less close than the first one.

6. As an article of manufacture, a flat straight webbing of textile material and comprising interwoven parallel portions extending lengthwise of the webbing, the warp threads of the several portions being of different densities to vary the density of the texture of the portions.

7. As an article of manufacture, a webbing of textile material and formed of two interwoven flat straight layers united at their ends, and one layer being of a uniform density in texture and the other being of a varying density in texture in a direction transverse to the length of the webbing.

8. As an article of manufacture, a lining for cone clutches and formed of a webbing having an outer layer of uniform density in texture and having an under layer of a varying density in texture in a direction transverse to the length of the webbing, the said webbing being adapted to shrink and form a conical lining.

9. As an article of manufacture, a lining for cone clutches formed of a webbing made of two interwoven layers of textile material of which one layer is capable of shrinking into conical form and in doing so causing the other layer to assume a like conical form.

10. A flat straight webbing gradually denser in texture in a direction transverse to the length of the webbing, and a conical face, the said webbing being adapted to be shrunk on the said conical face.

11. In combination, a conical surface and a flat straight woven endless webbing shrunk on the said conical surface.

12. In combination, a cone clutch and a lining therefor, the cone clutch having a conical rim and the lining being made of an endless webbing woven in a straight flat strip shrunk on the peripheral conical face of the rim and assuming the shape thereof.

13. In combination, a cone clutch and a lining therefor, the cone clutch having a conical rim and the lining being made of an endless webbing woven in a straight flat strip and with the density of the texture of the webbing varying in a direction transverse to the length of the webbing, the said webbing being shrunk on the said conical face of the rim and assuming the shape thereof.

14. In combination, a cone clutch and a lining therefor, the cone clutch having a conical rim and the lining being made of an endless webbing woven in a straight flat strip and with the density of the texture of the webbing varying in a direction transverse to the length of the webbing, the said webbing being shrunk on the said conical face of the rim and assuming the shape thereof, studs held on the said rim, and prongs embedded in the under side of the said lining.

15. The herein described method for forming a lining for a cone clutch consisting in weaving a flat straight webbing varying in density of texture in a direction transverse to the length of the webbing, uniting the ends of the webbing to form a circular band, placing the band on a conical surface and subjecting the band to a shrinking solution to cause the band to shrink tight on the said conical surface and to assume a conical shape.

WILLIAM ACHTMEYER.